US012469424B2

(12) United States Patent
Zheng et al.

(10) Patent No.: US 12,469,424 B2
(45) Date of Patent: Nov. 11, 2025

(54) DISPLAY PANEL, DRIVING METHOD THEREOF, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Kening Zheng, Beijing (CN); Xueguang Hao, Beijing (CN); Xing Yao, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/694,764

(22) PCT Filed: Dec. 20, 2022

(86) PCT No.: PCT/CN2022/140309
§ 371 (c)(1),
(2) Date: Mar. 22, 2024

(87) PCT Pub. No.: WO2024/130539
PCT Pub. Date: Jun. 27, 2024

(65) Prior Publication Data

US 2025/0140157 A1 May 1, 2025

(51) Int. Cl.
*G09G 3/20* (2006.01)

(52) U.S. Cl.
CPC ... *G09G 3/2074* (2013.01); *G09G 2300/0452* (2013.01); *G09G 2310/027* (2013.01);
(Continued)

(58) Field of Classification Search
CPC ......... G09G 3/2074; G09G 2300/0452; G09G 2310/027; G09G 2320/0214;
(Continued)

(56) References Cited

U.S. PATENT DOCUMENTS

| | | | | |
|---|---|---|---|---|
| 10,235,944 B2 * | 3/2019 | Lee | G09G 3/3233 | |
| 2011/0148908 A1 * | 6/2011 | Jeong | G09G 5/02 | 345/590 |

(Continued)

FOREIGN PATENT DOCUMENTS

| | | |
|---|---|---|
| CN | 105679235 A | 6/2016 |
| CN | 105788527 A | 7/2016 |

(Continued)

OTHER PUBLICATIONS

Written Opinion from PCT/CN2022/140309 dated Apr. 29, 2023.
International Search Report from PCT/CN2022/140309 dated Apr. 29, 2023.

*Primary Examiner* — Tom V Sheng
(74) *Attorney, Agent, or Firm* — Calfee, Halter & Griswold LLP

(57) ABSTRACT

A display panel, a driving method thereof, and a display apparatus are provided. The driving method includes: acquiring initial image data; and initiating a uniformity adjustment manner, wherein the uniformity adjustment manner comprises: turning off at least a portion of non-zero grayscale sub-pixel units in the display panel based on the initial image data.

19 Claims, 7 Drawing Sheets

(52) U.S. Cl.
CPC ............... *G09G 2320/0214* (2013.01); *G09G 2320/0233* (2013.01); *G09G 2320/0242* (2013.01); *G09G 2320/045* (2013.01); *G09G 2320/0666* (2013.01); *G09G 2320/0686* (2013.01)

(58) Field of Classification Search
CPC ... G09G 2320/0233; G09G 2320/0242; G09G 2320/045; G09G 2320/0666; G09G 2320/0686
USPC .......................................................... 345/694
See application file for complete search history.

(56) References Cited

U.S. PATENT DOCUMENTS

| | | | | |
|---|---|---|---|---|
| 2017/0110059 | A1 | 4/2017 | Sung | |
| 2019/0392769 | A1* | 12/2019 | Lee | G09G 3/3225 |
| 2020/0365090 | A1* | 11/2020 | Yoon | G09G 3/2074 |
| 2023/0133405 | A1* | 5/2023 | Kato | G09G 3/20 345/63 |
| 2024/0169878 | A1* | 5/2024 | Zheng | G09G 3/2074 |

FOREIGN PATENT DOCUMENTS

| | | | |
|---|---|---|---|
| CN | 108257556 | A | 7/2018 |
| CN | 111341254 | A | 6/2020 |
| CN | 115294930 | A | 11/2022 |

* cited by examiner

DISPLAY PANEL, DRIVING METHOD THEREOF, AND DISPLAY APPARATUS

CROSS-REFERENCE TO RELATED APPLICATIONS

The present application is the U.S. National Stage of International Application No. PCT/CN2022/140309, filed on Dec. 20, 2022, the entire disclosure of which is incorporated herein by reference for all purposes.

TECHNICAL FIELD

The present disclosure relates to the field of display technology, and in particular to a display panel, a driving method thereof, and a display apparatus.

BACKGROUND

A display panel may have poor display uniformity due to voltage offset of the driving transistor threshold, color crosstalk of the light emitting unit, performance variation of the light emitting unit, and the like.

It is to be noted that the information disclosed in the above background art section is only used to enhance the understanding of the background of the present disclosure, and thus may include information that does not constitute prior art known to those of ordinary skill in the art.

SUMMARY

According to an aspect of the present disclosure, there is provided a driving method of a display panel, including:

acquiring initial image data; and initiating a uniformity adjustment manner, wherein the uniformity adjustment manner includes: turning off at least a portion of non-zero grayscale sub-pixel units in the display panel based on the initial image data.

In an example embodiment of the present disclosure, a display region of the display panel includes a plurality of display sub-regions, and sub-pixel units located in respective display sub-regions;

wherein the initial image data includes a plurality of sub-image data, the sub-image data and the display sub-regions are provided correspondingly, and the display sub-regions are configured to display the sub-image data corresponding thereto;

wherein turning off at least a portion of non-zero grayscale sub-pixel units in the display panel based on the initial image data includes:

turning off at least a portion of the sub-pixel units in at least a portion of the display sub-regions based on the initial image data.

In an example embodiment of the present disclosure, the sub-pixel unit includes a pixel driving circuit, the pixel driving circuit includes a driving transistor;

wherein turning off at least a portion of non-zero grayscale sub-pixel units in at least a portion of the display sub-regions based on the initial image data includes:

acquiring a standard threshold voltage of the display panel;

acquiring threshold voltages of at least a portion of the driving transistors in the display sub-region;

acquiring a reference threshold voltage corresponding to the display sub-region based on the acquired threshold voltages of the driving transistors in the display sub-region;

turning off at least a portion of the sub-pixel units in the display sub-region based on a degree that the reference threshold voltage corresponding to the sub-display region deviates from the standard threshold voltage.

In an example embodiment of the present disclosure, the plurality of display sub-regions include a first display sub-region, the first display sub-region has a color deviation smaller than or equal to 2JNCD;

wherein acquiring a standard threshold voltage of the display panel includes:

acquiring a reference threshold voltage of the first display sub-region as the standard threshold voltage.

In an example embodiment of the present disclosure, acquiring a standard threshold voltage of the display panel includes:

acquiring a threshold voltage set by the driving transistor during gamma adjustment as the standard threshold voltage.

In an example embodiment of the present disclosure, acquiring a reference threshold voltage corresponding to the display sub-region based on the acquired threshold voltages of the driving transistors in the display sub-region includes:

acquiring an average value of a plurality of threshold voltages as the reference threshold voltage based on the acquired threshold voltages of the driving transistors in the display sub-region; or, acquiring a median value of the plurality of threshold voltages as the reference threshold voltage based on the acquired threshold voltages of the driving transistors in the display sub-region.

In an example embodiment of the present disclosure, when the driving transistor is an N-type transistor, wherein turning off at least a portion of the sub-pixel units in the display sub-region based on a degree that the reference threshold voltage in the sub-display region deviates from the standard threshold voltage includes:

turning off at least a portion of red sub-pixel units and green sub-pixel units in the display sub-region when the reference threshold voltage is greater than the standard threshold voltage;

turning off at least a portion of blue sub-pixel units in the display sub-region when the reference threshold voltage is smaller than the standard threshold voltage, when the driving transistor is a P-type transistor, wherein turning off at least a portion of the sub-pixel units in the display sub-region based on a degree that the reference threshold voltage in the sub-display region deviates from the standard threshold voltage includes:

turning off at least a portion of red sub-pixel units and green sub-pixel units in the display sub-region when the reference threshold voltage is smaller than the standard threshold voltage;

turning off at least a portion of blue sub-pixel units in the display sub-region when the reference threshold voltage is greater than the standard threshold voltage.

In an example embodiment of the present disclosure, when the driving transistor is an N-type transistor, wherein turning off at least a portion of the sub-pixel units in the display sub-region based on a degree that the reference threshold voltage in the sub-display region deviates from the standard threshold voltage includes:

turning off at least a portion of red sub-pixel units, green sub-pixel units, and blue sub-pixel units in the display sub-region when the reference threshold voltage is smaller than the standard threshold voltage;

when the driving transistor is a P-type transistor, wherein turning off at least a portion of the sub-pixel units in the display sub-region based on a degree that the reference threshold voltage in the sub-display region deviates from the standard threshold voltage includes:

turning off at least a portion of red sub-pixel units, green sub-pixel units, and blue sub-pixel units in the display sub-region when the reference threshold voltage is greater than the standard threshold voltage.

In an example embodiment of the present disclosure, the display sub-region includes a plurality of secondary display sub-regions, the secondary display sub-region includes M1 sub-pixel units, turning off at least a portion of the sub-pixel units in the display sub-region includes:

turning off M2 sub-pixel units in each of the secondary display sub-regions, wherein M2/M1 is smaller than or equal to 90%.

In an example embodiment of the present disclosure, the standard threshold voltage is Vth1, the reference threshold voltage is Vth2, a quantity of sub-pixel units in the display sub-region is X1, and a quantity of turned-off sub-pixel units in the display sub-region is X2;

wherein |(Vth1−Vth2)/Vth1| and X2/X1 are positively correlated.

In an example embodiment of the present disclosure, turning off at least a portion of non-zero grayscale sub-pixel units in at least a portion of the display sub-regions based on the initial image data includes:

invoking a pre-stored first database, wherein the first database includes a color and a corresponding quantity ratio of sub-pixel units to be turned off in each display sub-region;

turning off sub-pixel units of a corresponding color and quantity ratio in the display sub-region based on the first database.

In an example embodiment of the present disclosure, the first database is acquired by color accuracy of each display sub-region in the display panel.

In an example embodiment of the present disclosure, the turned-off sub-pixel unit is a low grayscale sub-pixel unit.

In an example embodiment of the present disclosure, turning off at least a portion of the sub-pixel units in at least a portion of the display sub-regions based on the initial image data includes:

turning off repeating units in a portion of the display sub-regions based on the initial image data, wherein the repeating units include sub-pixel units of different colors.

In an example embodiment of the present disclosure, the driving method further includes:

acquiring grayscales of at least a portion of the sub-pixel units in the display sub-region based on the sub-image data, and acquiring a reference grayscale value corresponding to the display sub-region based on the acquired grayscales of at least a portion of the sub-pixel units in the display sub-region;

determining a quantity of sub-pixel units in the repeating unit based on the reference grayscale value, wherein the reference grayscale value and the quantity of sub-pixel units in the repeating unit are positively correlated.

In an example embodiment of the present disclosure, turning off at least a portion of non-zero grayscale sub-pixel units in at least a portion of the display sub-regions based on the initial image data includes:

acquiring a current display brightness value of the display panel;

acquiring grayscales of at least a portion of the sub-pixel units in the display sub-region based on the sub-image data, and acquiring a reference grayscale value corresponding to the display sub-region based on the acquired grayscales of at least a portion of the sub-pixel units in the display sub-region;

controlling a turn-off ratio of sub-pixel units in the display sub-region based on the current display brightness value and the reference grayscale value, wherein the turn-off ratio is a ratio of a quantity of turned-off sub-pixel units in the display sub-region to a total quantity of sub-pixel units in the display sub-region;

wherein the current display brightness value and the turn-off ratio are negatively correlated, and the reference grayscale value and the turn-off ratio are negatively correlated.

In an example embodiment of the present disclosure, acquiring a reference grayscale value corresponding to the display sub-region based on the acquired grayscales of at least a portion of the sub-pixel units in the display sub-region includes:

acquiring an average value of a plurality of grayscales as the reference grayscale value based on the acquired grayscales of at least a portion of the sub-pixel units in the display sub-region; or, acquiring a median value of the plurality of grayscales as the reference grayscale value based on the acquired grayscales of at least a portion of the sub-pixel units in the display sub-region.

In an example embodiment of the present disclosure, the driving method further includes:

acquiring a current display brightness value of the display panel;

acquiring a grayscale threshold value using the current display brightness value based on a second database pre-stored in the display panel, wherein the second database includes a mapping relationship between the current display brightness value and the grayscale threshold value;

acquiring grayscales of at least a portion of sub-pixel units in the display sub-region based on the sub-image data, and acquiring a reference grayscale value corresponding to the display sub-region based on the acquired grayscales of at least a portion of sub-pixel units in the display sub-region;

comparing the grayscale threshold and the reference grayscale value, and initiating the uniformity adjustment manner when the reference grayscale value is smaller than or equal to the grayscale threshold.

In an example embodiment of the present disclosure, when the display panel is driven by pure image data of a first color, at least a portion of the sub-pixel units display the first color and a second color;

wherein turning off at least a portion of non-zero grayscale sub-pixel units in at least a portion of the display sub-regions based on the initial image data includes:

turning off at least a portion of the sub-pixel units of the second color when the initial image data includes data for driving sub-pixel units of the first color and sub-pixel units of the second color.

In an example embodiment of the present disclosure, the first color is green, the second color is red, and the display panel has a color coordinate x of 0.328-0.4 when the display panel is driven by pure image data of the first color;

wherein turning off at least a portion of the sub-pixel units of the second color includes:

turning off more than 95% of the sub-pixel units of the second color.

In an example embodiment of the present disclosure, turning off the non-zero grayscale sub-pixel unit includes:

writing a data signal of zero grayscale to the non-zero grayscale sub-pixel unit; or, not writing the data signal to the non-zero grayscale sub-pixel unit.

According to an aspect of the present disclosure, there is provided a display panel, including: a plurality of sub-pixel units; and a driving chip, configured to:

acquire initial image data; and initiate a uniformity adjustment manner, wherein the uniformity adjustment manner includes: turning off at least a portion of non-zero grayscale sub-pixel units in the display panel based on the initial image data.

In an example embodiment of the present disclosure, the display panel further includes:

a source driving circuit, configured to provide a data signal to the sub-pixel unit under control of the driving chip, wherein the driving chip is capable of controlling the source driving circuit to write a data signal of zero grayscale to a non-zero grayscale sub-pixel unit to turn off the non-zero grayscale sub-pixel unit; or, the driving chip is capable of controlling the source driving circuit not to write a data signal to the non-zero grayscale sub-pixel unit to turn off the non-zero grayscale sub-pixel unit.

In an example embodiment of the present disclosure, a display region of the display panel includes a plurality of display sub-regions, and sub-pixel units located in respective display sub-regions;

wherein the initial image data includes a plurality of sub-image data, the sub-image data and the display sub-regions are provided correspondingly, and the display sub-regions are configured to display the sub-image data corresponding thereto;

wherein turning off at least a portion of non-zero grayscale sub-pixel units in the display panel based on the initial image data includes:

turning off at least a portion of the sub-pixel units in at least a portion of the display sub-regions based on the initial image data.

In an example embodiment of the present disclosure, the sub-pixel unit includes a pixel driving circuit, the pixel driving circuit includes a driving transistor;

wherein turning off at least a portion of non-zero grayscale sub-pixel units in at least a portion of the display sub-regions based on the initial image data includes:

acquiring a standard threshold voltage of the display panel;

acquiring threshold voltages of at least a portion of the driving transistors in the display sub-region;

acquiring a reference threshold voltage corresponding to the display sub-region based on the acquired threshold voltages of the driving transistors in the display sub-region;

turning off at least a portion of the sub-pixel units in the display sub-region based on a degree that the reference threshold voltage corresponding to the sub-display region deviates from the standard threshold voltage.

In an example embodiment of the present disclosure, the plurality of display sub-regions include a first display sub-region, the first display sub-region has a color deviation smaller than or equal to 2JNCD;

wherein acquiring a standard threshold voltage of the display panel includes:

acquiring a reference threshold voltage of the first display sub-region as the standard threshold voltage.

In an example embodiment of the present disclosure, acquiring a standard threshold voltage of the display panel includes:

acquiring a threshold voltage set by the driving transistor during gamma adjustment as the standard threshold voltage.

In an example embodiment of the present disclosure, acquiring a reference threshold voltage corresponding to the display sub-region based on the acquired threshold voltages of the driving transistors in the display sub-region includes:

acquiring an average value of a plurality of threshold voltages as the reference threshold voltage based on the acquired threshold voltages of the driving transistors in the display sub-region; or, acquiring a median value of the plurality of threshold voltages as the reference threshold voltage based on the acquired threshold voltages of the driving transistors in the display sub-region.

In an example embodiment of the present disclosure, when the driving transistor is an N-type transistor, wherein turning off at least a portion of the sub-pixel units in the display sub-region based on a degree that the reference threshold voltage in the sub-display region deviates from the standard threshold voltage includes:

turning off at least a portion of red sub-pixel units and green sub-pixel units in the display sub-region when the reference threshold voltage is greater than the standard threshold voltage;

turning off at least a portion of blue sub-pixel units in the display sub-region when the reference threshold voltage is smaller than the standard threshold voltage;

when the driving transistor is a P-type transistor, wherein turning off at least a portion of the sub-pixel units in the display sub-region based on a degree that the reference threshold voltage in the sub-display region deviates from the standard threshold voltage includes:

turning off at least a portion of red sub-pixel units and green sub-pixel units in the display sub-region when the reference threshold voltage is smaller than the standard threshold voltage;

turning off at least a portion of blue sub-pixel units in the display sub-region when the reference threshold voltage is greater than the standard threshold voltage.

In an example embodiment of the present disclosure, when the driving transistor is an N-type transistor, wherein turning off at least a portion of the sub-pixel units in the display sub-region based on a degree that the reference threshold voltage in the sub-display region deviates from the standard threshold voltage includes:

turning off at least a portion of red sub-pixel units, green sub-pixel units, and blue sub-pixel units in the display sub-region when the reference threshold voltage is smaller than the standard threshold voltage;

when the driving transistor is a P-type transistor, wherein turning off at least a portion of the sub-pixel units in the display sub-region based on a degree that the reference threshold voltage in the sub-display region deviates from the standard threshold voltage includes:

turning off at least a portion of red sub-pixel units, green sub-pixel units, and blue sub-pixel units in the display sub-region when the reference threshold voltage is greater than the standard threshold voltage.

In an example embodiment of the present disclosure, the display sub-region includes a plurality of secondary display sub-regions, the secondary display sub-region includes M1 sub-pixel units, turning off at least a portion of the sub-pixel units in the display sub-region includes:

turning off M2 sub-pixel units in each of the secondary display sub-regions, wherein M2/M1 is smaller than or equal to 90%.

In an example embodiment of the present disclosure, the standard threshold voltage is Vth1, the reference threshold voltage is Vth2, a quantity of sub-pixel units in the display sub-region is X1, and a quantity of turned-off sub-pixel units in the display sub-region is X2;

wherein $|(Vth1-Vth2)/Vth1|$ and X2/X1 are positively correlated.

In an example embodiment of the present disclosure, turning off at least a portion of non-zero grayscale sub-pixel units in at least a portion of the display sub-regions based on the initial image data includes:

invoking a pre-stored first database, wherein the first database includes a color and a corresponding quantity ratio of sub-pixel units to be turned off in each display sub-region;

turning off sub-pixel units of a corresponding color and quantity ratio in the display sub-region based on the first database.

In an example embodiment of the present disclosure, the first database is acquired by color accuracy of each display sub-region in the display panel.

In an example embodiment of the present disclosure, the turned-off sub-pixel unit is a low grayscale sub-pixel unit.

In an example embodiment of the present disclosure, turning off at least a portion of the sub-pixel units in at least a portion of the display sub-regions based on the initial image data includes:

turning off repeating units in a portion of the display sub-regions based on the initial image data, wherein the repeating units include sub-pixel units of different colors.

In an example embodiment of the present disclosure, the driving chip is further configured to:

acquire grayscales of at least a portion of the sub-pixel units in the display sub-region based on the sub-image data, and acquire a reference grayscale value corresponding to the display sub-region based on the acquired grayscales of at least a portion of the sub-pixel units in the display sub-region;

determine a quantity of sub-pixel units in the repeating unit based on the reference grayscale value, wherein the reference grayscale value and the quantity of sub-pixel units in the repeating unit are positively correlated.

In an example embodiment of the present disclosure, turning off at least a portion of non-zero grayscale sub-pixel units in at least a portion of the display sub-regions based on the initial image data includes:

acquiring a current display brightness value of the display panel;

acquiring grayscales of at least a portion of the sub-pixel units in the display sub-region based on the sub-image data, and acquiring a reference grayscale value corresponding to the display sub-region based on the acquired grayscales of at least a portion of the sub-pixel units in the display sub-region;

controlling a turn-off ratio of sub-pixel units in the display sub-region based on the current display brightness value and the reference grayscale value, wherein the turn-off ratio is a ratio of a quantity of turned-off sub-pixel units in the display sub-region to a total quantity of sub-pixel units in the display sub-region;

wherein the current display brightness value and the turn-off ratio are negatively correlated, and the reference grayscale value and the turn-off ratio are negatively correlated.

In an example embodiment of the present disclosure, acquiring a reference grayscale value corresponding to the display sub-region based on the acquired grayscales of at least a portion of the sub-pixel units in the display sub-region includes:

acquiring an average value of a plurality of grayscales as the reference grayscale value based on the acquired grayscales of at least a portion of the sub-pixel units in the display sub-region; or, acquiring a median value of the plurality of grayscales as the reference grayscale value based on the acquired grayscales of at least a portion of the sub-pixel units in the display sub-region.

In an example embodiment of the present disclosure, the driving chip is further configured to:

acquire a current display brightness value of the display panel;

acquire a grayscale threshold value using the current display brightness value based on a second database pre-stored in the display panel, wherein the second database includes a mapping relationship between the current display brightness value and the grayscale threshold value;

acquire grayscales of at least a portion of sub-pixel units in the display sub-region based on the sub-image data, and acquire a reference grayscale value corresponding to the display sub-region based on the acquired grayscales of at least a portion of sub-pixel units in the display sub-region;

compare the grayscale threshold and the reference grayscale value, and initiate the uniformity adjustment manner when the reference grayscale value is smaller than or equal to the grayscale threshold.

In an example embodiment of the present disclosure, when the display panel is driven by pure image data of a first color, at least a portion of the sub-pixel units display the first color and a second color;

wherein turning off at least a portion of non-zero grayscale sub-pixel units in at least a portion of the display sub-regions based on the initial image data includes:

turning off at least a portion of the sub-pixel units of the second color when the initial image data includes data for driving sub-pixel units of the first color and sub-pixel units of the second color.

According to an aspect of the present disclosure, there is provided a display apparatus, including the display panel described above.

It should be understood that the above general description and the following detailed description are exemplary and explanatory only, and do not limit the present disclosure.

BRIEF DESCRIPTION OF THE DRAWINGS

The accompanying drawings herein are incorporated into and form a part of the specification, illustrate embodiments consistent with the present disclosure, and are used in conjunction with the specification to explain the principles of the present disclosure. Apparently, the accompanying drawings in the following description are only some of the embodiments of the present disclosure, and other accompanying drawings may be obtained from these drawings without creative labor for those of ordinary skill in the art.

DETAILED DESCRIPTION

Figure 1:
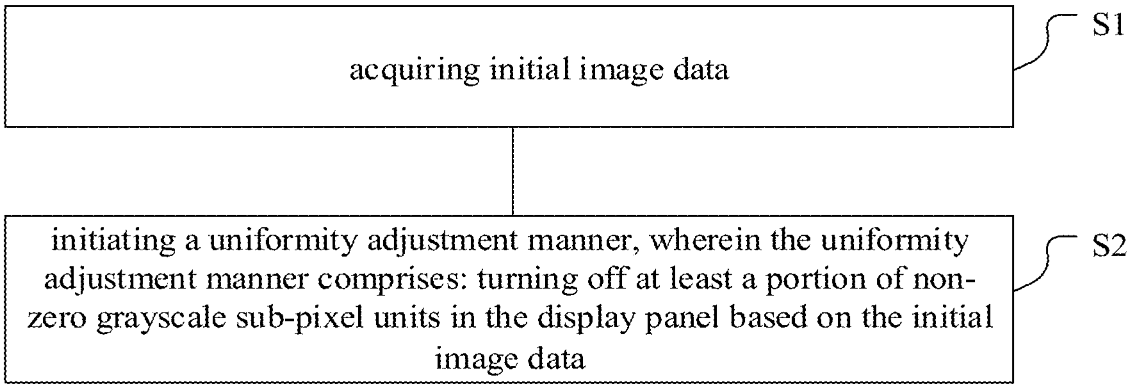
FIG. 1 shows a flowchart of an example embodiment of a driving method of a display panel of the present disclosure.

Example embodiments will now be described more fully with reference to the accompanying drawings. However, the example embodiments are capable of being implemented in a variety of forms and should not be construed as being limited to the examples set forth herein; rather, the provision of these embodiments allows the present disclosure to be more comprehensive and complete and conveys the idea of the example embodiments in a comprehensive manner to those skilled in the art. The same reference numerals in the drawings denote the same or similar structures, and thus their detailed descriptions will be omitted.

The terms "a", "an", and "the" are used to indicate the presence of one or more elements/components/etc.; the terms "including" and "having" are used to indicate open-ended inclusion and mean that there may be additional elements/components/etc. in addition to the listed elements/components/etc.

The display panel typically includes a plurality of sub-pixel units. The sub-pixel units may include a pixel driving circuit and a light emitting unit. The pixel driving circuit is used to provide a driving current to the light emitting unit to drive the light emitting unit to emit light. The pixel driving circuit includes a driving transistor and a switching transistor connected to a gate of the driving transistor. The driving current provided by the pixel driving circuit is related to a threshold value of the driving transistor. Due to the production process and other reasons, the thresholds of the driving transistors at different locations of the display panel differ. At the same time, the thresholds of the driving transistors may drift, which results in that the pixel driving circuits at different locations of the display panel output different driving currents under the same grayscale, resulting in poor display uniformity of the display panel. The display uniformity includes luminance uniformity and chromaticity uniformity. At the same time, changes in the aging performance of the light emitting unit may also lead to uneven display of the display panel, for example, after a reliability test of the display panel, the display panel may have a yellowish white screen. In addition, color crosstalk of the light emitting unit and other reasons can also lead to uneven display of the display panel. For example, the display panel may be reddish under a pure green screen.

Based on this, the present example embodiment first provides a driving method of a display panel. As shown in FIG. 1, it is a flowchart of an example embodiment of the driving method of the display panel of the present disclosure. The driving method includes:

Step S1, initial image data is acquired.

Step S2, a uniformity adjustment manner is initiated. The uniformity adjustment manner includes: turning off at least a portion of non-zero grayscale sub-pixel units in the display panel based on the initial image data.

The driving method of the display panel provided in this example embodiment may turn off a portion of the non-zero grayscale sub-pixels according to brightness uniformity and the chromaticity uniformity of the display panel, and the non-zero grayscale sub-pixels that are turned off may adjust the brightness deviation and the color deviation of the display panel locally or as a whole.

In the present example embodiment, the uniformity adjustment manner can solve the problem of poor brightness uniformity and color deviation at different locations of the display panel. For example, in the present example embodiment, a display region of the display panel includes a plurality of display sub-regions, and sub-pixel units located in respective display sub-regions; wherein the initial image data includes a plurality of sub-image data, the sub-image data and the display sub-regions are provided correspondingly, and the display sub-regions are configured to display the sub-image data corresponding thereto; wherein turning off at least a portion of non-zero grayscale sub-pixel units in the display panel based on the initial image data may include:

turning off at least a portion of the sub-pixel units in at least a portion of the display sub-regions based on the initial image data.

In the driving method of the display panel provided by the present example embodiment, non-zero grayscale sub-pixel units in a portion of the display sub-regions in the display panel are turned off, so that the luminance and chromaticity of the display sub-region can be adjusted, and thus the different display sub-regions of the display panel have better display uniformity.

Figure 2:
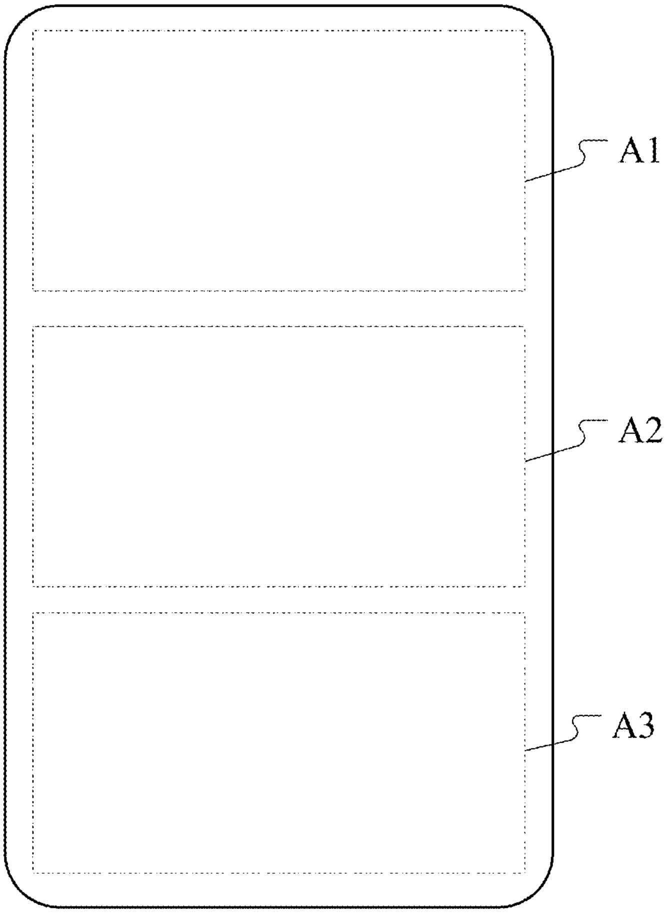
FIG. 2 shows a schematic diagram of color deviation of a display panel in the related art.

As shown in FIG. 2, it is a schematic diagram of color deviation of a display panel in the related art. The display region of the display panel may include a first display region A1, a second display region A2, and a third display region A3 distributed in a lengthwise direction. In a white screen display state, the second display region A2 displays a white screen, the first display region A1 displays a reddish color, and the third display region A3 displays a greenish color. The uniformity adjustment manner in this example embodiment may divide the display panel into three display sub-regions overlapping with the first display region A1, the second display region A2, and the third display region A3. The uniformity adjustment manner may turn off a portion of the red sub-pixel units in the first display region A1, to cause the first display region A1 to display a white screen. The uniformity adjustment manner may turn off a portion of the green sub-pixel units in the third display region A3, to cause the third display region A3 to display a white screen. In other example embodiments, the uniformity adjustment manner may also divide the display panel into a greater number of display sub-regions. For example, the first display region A1 may include a plurality of display sub-regions, and the uniformity adjustment manner may turn off a different number of red sub-pixel units according to the degree of color deviation of different display sub-regions in the first display region A1.

Figure 3:
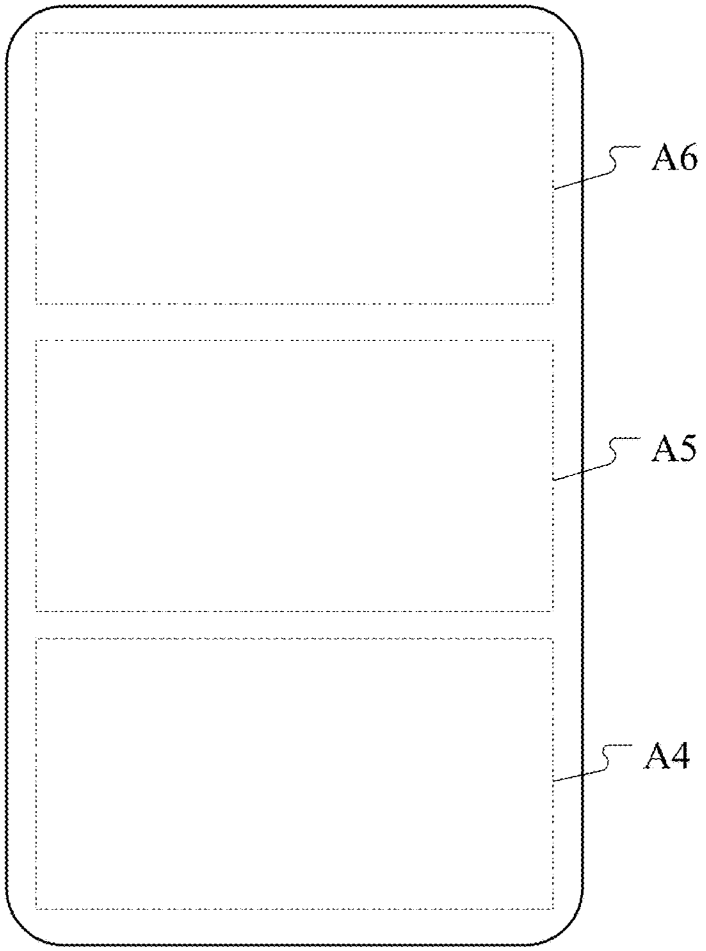
FIG. 3 shows a schematic diagram of uneven brightness of a display panel in the related art.

As shown in FIG. 3, it is a schematic diagram of uneven brightness of a display panel in the related art. The display region of the display panel may include a fourth display region A4, a fifth display region A5, and a sixth display region A6. Due to reasons such as voltage drop of the power supply line, under the same grayscale, the actual brightness of the fourth display region A4 is greater than the actual brightness of the fifth display region A5, and the actual brightness of the sixth display region A6 is less than the actual brightness of the fifth display region A5. The uniformity adjustment manner in the present example embodiment may divide the display region into three display sub-regions overlapping with the fourth display region A4, the fifth display region A5, and the sixth display region A6. The uniformity adjustment manner may turn off a portion of the red sub-pixel units, the green sub-pixel units, and the blue sub-pixel units in the fourth display region A4 and the fifth display region A5, to make the display brightness of different regions of the display panel uniform. Similarly, in other example embodiments, the uniformity adjustment manner may also divide the display panel into a greater number of display sub-regions. For example, the fourth display region A4 may include a plurality of display sub-regions, and the uniformity adjustment manner may turn off a different number of sub-pixel units according to the deviation degree of the actual luminance of different display sub-regions in the fourth display region A4.

It is to be noted that in the present example embodiment, the uniformity adjustment manner performs sub-pixel turn-off adjustment for respective display sub-regions according to the brightness difference and the chromaticity difference of each display sub-region. The brightness difference and the chromaticity difference of each display sub-region may be obtained by actual measurement. The display panel only needs to store data about the sub-pixel turn-off manner corresponding to each display sub-region, and the data can be invoked to adjust each display sub-region when the display panel is driven. In addition, the uniformity adjustment manner in the present example embodiment may also turn off a portion of the sub-pixel units for both the luminance deviation and the chromaticity deviation of each display sub-region, so as to make each display sub-region have uniform luminance and chromaticity. For example, when the fourth display region A4 is greenish in a white screen state, the uniformity adjustment manner may turn off the green sub-pixel units in a large proportion when adjusting the brightness of the fourth display region A4, in order to simultaneously adjust the chromaticity.

Figure 4:
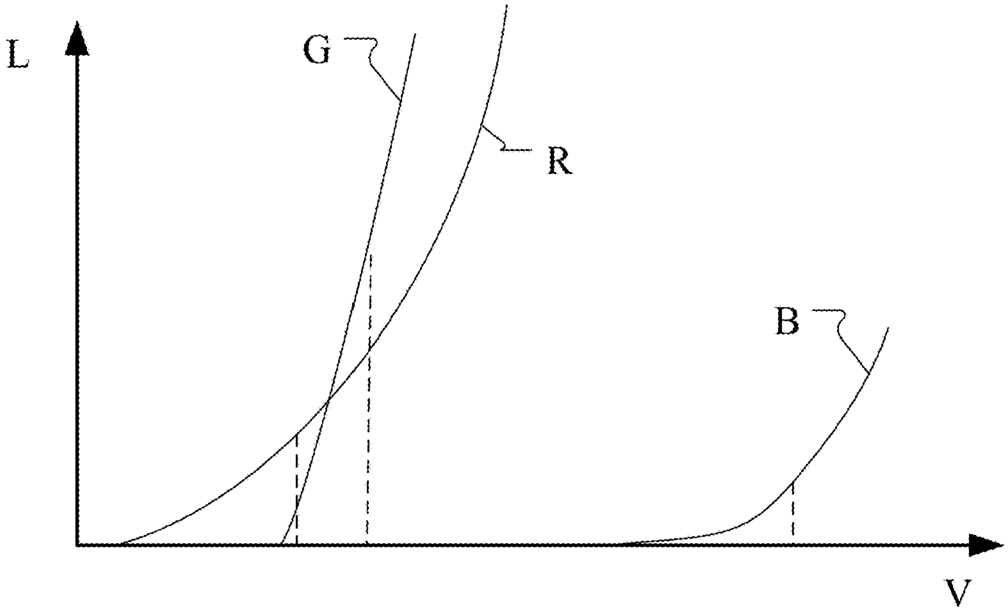
FIG. 4 is a schematic diagram of the voltage required for light emitting units of each color of a white screen during gamma adjustment.
Figure 5:
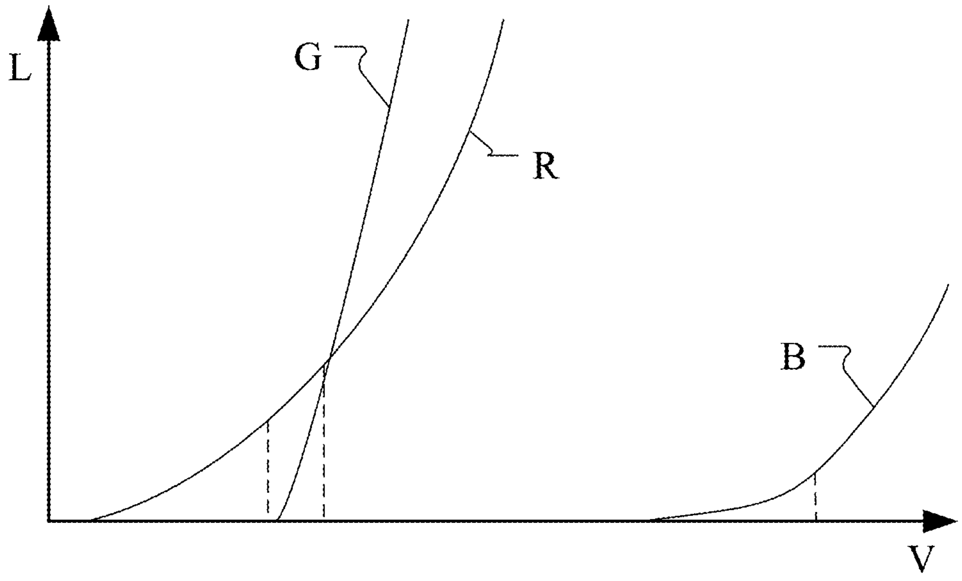
FIG. 5 shows a schematic diagram of the voltage required for light emitting units of each color of the white screen when the threshold voltage of the driving transistor is positively biased.
Figure 6:
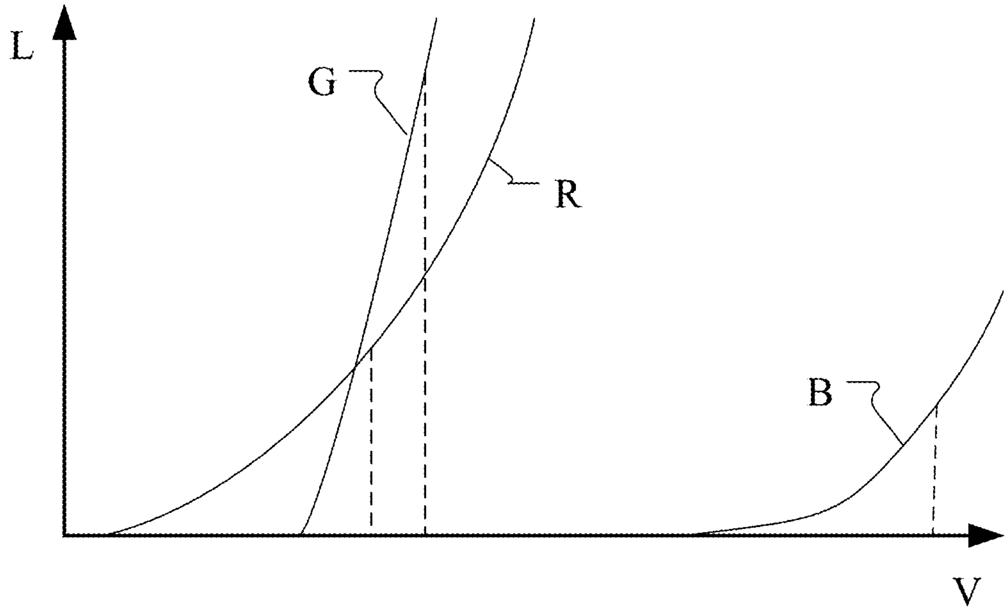
FIG. 6 shows a schematic diagram of the voltage required for light emitting units of each color of the white screen when the threshold voltage of the driving transistor is negatively biased.

In this example embodiment, the threshold voltage of the driving transistor affects the luminous brightness of the light emitting unit, thereby affecting the display uniformity of the display panel. As shown in FIGS. 4-6, they are mechanism diagrams of the influence of the threshold offset of the driving transistor on the luminance of the light emitting unit when the driving transistor is an N-type transistor. FIG. 4 is a schematic diagram of the voltage required for light emitting units of each color of a white screen during gamma adjustment. FIG. 5 shows a schematic diagram of the voltage required for light emitting units of each color of the white screen when the threshold voltage of the driving transistor is positively biased. FIG. 6 shows a schematic diagram of the voltage required for light emitting units of each color of the white screen when the threshold voltage of the driving transistor is negatively biased. As shown in FIGS. 4-6, in the two-dimensional coordinate, the horizontal coordinate indicates the data signal voltage, and the vertical coordinate indicates the brightness of each sub-pixel unit. The curve R in each figure indicates a relationship curve between the brightness of the red sub-pixel unit and the data signal voltage, the curve G in each figure indicates a relationship curve between the brightness of the green sub-pixel unit and the data signal voltage, and the curve B in each figure indicates a relationship curve between the brightness of the blue sub-pixel unit and the data signal voltage. In FIG. 4, the data voltages corresponding to the intersection positions of curve R, curve G, and curve B with the dotted lines indicate the data signal voltages of the sub-pixel units of each color required for the white screen during gamma adjustment. In FIG. 5, the data voltages corresponding to the intersection positions of curve R, curve G, and curve B with the dotted lines indicate the data signal voltages of the sub-pixel units of each color required for the white screen when the threshold voltage of the driving transistor is positively biased. In FIG. 6, the data voltages corresponding to the intersection positions of curve R, curve G, and curve B with the dotted lines indicate the data signal voltages of the sub-pixel units of each color required for the white screen when the threshold voltage of the driving transistor is negatively biased. According to FIGS. 4-6, it can be seen that since the luminous efficiency of the green light emitting unit and the red light emitting unit is greater than that of the blue light emitting unit, when the threshold voltage of the driving transistor is positively biased or negatively biased so as to affect the driving current, the brightness change of the green light emitting unit and the red light emitting unit is greater than that of the blue light emitting unit. For example, in the embodiment in which the driving transistor is an N-type transistor, when the threshold voltage of the driving transistor is positively biased, the output current of the pixel driving circuit decreases, the brightness of the light emitting unit decreases, and the brightness change of the green light emitting unit and the red light emitting unit is large, thereby causing the display panel to be yellowish when displaying a white screen. When the threshold voltage of the driving transistor is negatively biased, the output current of the pixel driving circuit increases, the brightness of the light emitting unit increases, and the brightness change of the green light emitting unit and the red light emitting unit is large, thereby causing the display panel to be greenish when displaying a white screen.

In this example embodiment, turning off at least a portion of non-zero grayscale sub-pixel units in at least a portion of the display sub-regions based on the initial image data may include:

- acquiring a standard threshold voltage of the display panel;
- acquiring threshold voltages of at least a portion of the driving transistors in the display sub-region;

acquiring a reference threshold voltage corresponding to the display sub-region based on the acquired threshold voltages of the driving transistors in the display sub-region;

turning off at least a portion of the sub-pixel units in the display sub-region based on a degree that the reference threshold voltage corresponding to the sub-display region deviates from the standard threshold voltage.

In this example embodiment, the standard threshold voltage of the display panel may characterize the threshold voltage before threshold offset of the driving transistor. For example, acquiring a standard threshold voltage of the display panel may include: acquiring a threshold voltage set by the driving transistor during gamma adjustment as the standard threshold voltage. The reference threshold voltage corresponding to a display sub-region may characterize an overall state of the threshold voltage of the driving transistor in the display sub-region. For example, acquiring a reference threshold voltage corresponding to the display sub-region based on the acquired threshold voltages of the driving transistors in the display sub-region may include: acquiring an average value of a plurality of threshold voltages as the reference threshold voltage based on the acquired threshold voltages of the driving transistors in the display sub-region; or, acquiring a median value of the plurality of threshold voltages as the reference threshold voltage based on the acquired threshold voltages of the driving transistors in the display sub-region. In this example embodiment, sub-pixel units of a predetermined number and color in the display sub-region are turned off according to a degree of deviation of the reference threshold voltage corresponding to the display sub-region from the standard threshold voltage, so as to achieve adjustment of the color deviation in the display sub-region.

In the present example embodiment, acquiring threshold voltages of at least a portion of the driving transistors in the display sub-region may include: acquiring threshold voltages of all driving transistors in the display sub-region. The threshold voltages of the driving transistors may be acquired in real time during the use of the display panel. For example, the threshold voltages of the driving transistors may be acquired when the display panel is powered on or off. It should be understood that, in other example embodiments, the threshold voltages of a portion of the driving transistors in the display sub-region may also be acquired randomly, in order to reduce the computational load of the display panel. In addition, in order to improve the accuracy of the reference threshold voltage characterizing the overall state of the threshold voltages of the driving transistors in the display sub-region, one or more extremely small values and one or more extremely large values of the threshold voltages may also be excluded when the reference threshold voltage is calculated.

It should be understood that, in other example embodiments, the reference threshold voltage of the display sub-region may also be acquired in other ways. For example, in this example embodiment, the plurality of the display sub-regions includes a first display sub-region. The color deviation of the first display sub-region is smaller than or equal to 2JNCD (Just Noticeable Color Difference). For example, the color deviation of the first display sub-region may be equal to 0.1 JNCD, 0.5 JNCD, 1 JNCD, 2JNCD. Acquiring a standard threshold voltage of the display panel may include: acquiring a reference threshold voltage of the first display sub-region as the standard threshold voltage of the display panel.

In the example embodiment, a first display sub-region with small color deviation in the display panel may be acquired by means of actual detection, and the first display sub-region may be located in a center region of the display panel. Thereby, a reference threshold voltage of the first display sub-region with small color deviation is set as a standard threshold voltage of the display panel. The location of the first display sub-region may be pre-written into the display panel, and the display panel may acquire the threshold voltage of the driving transistor in the first display sub-region during the driving process, thereby acquiring the standard threshold voltage.

In this example embodiment, when the driving transistor is an N-type transistor, turning off at least a portion of the sub-pixel units in the display sub-region based on a degree that the reference threshold voltage in the sub-display region deviates from the standard threshold voltage may include:

turning off at least a portion of red sub-pixel units and green sub-pixel units in the display sub-region when the reference threshold voltage is greater than the standard threshold voltage;

turning off at least a portion of blue sub-pixel units in the display sub-region when the reference threshold voltage is smaller than the standard threshold voltage.

Figure 7:
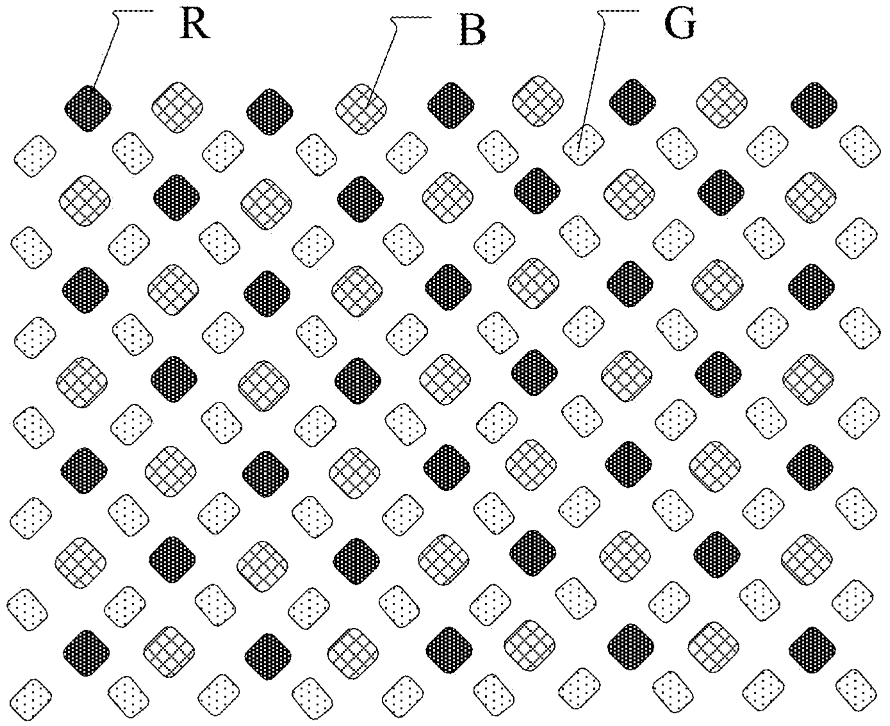
FIG. 7 shows a distribution diagram of sub-pixel units of a display panel in an example embodiment of the present disclosure.
Figure 8:
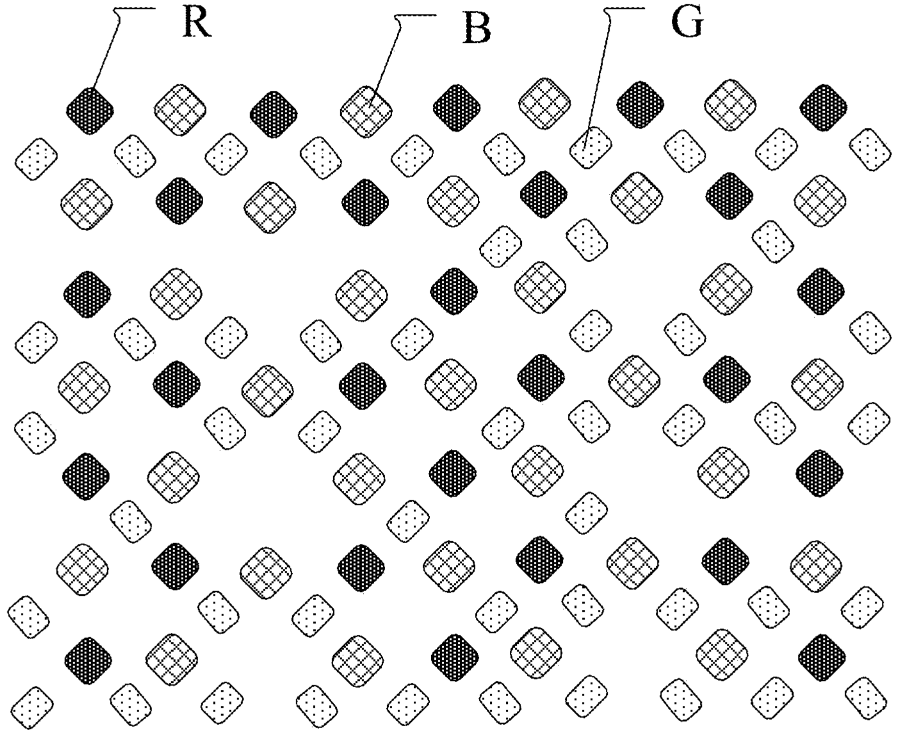
FIG. 8 shows a structural schematic diagram of turning off a portion of the red sub-pixel units and the green sub-pixels.

As shown in FIGS. 7 and 8, FIG. 7 shows a distribution diagram of sub-pixel units of a display panel in an example embodiment of the present disclosure, and FIG. 8 shows a structural schematic diagram of turning off a portion of the red sub-pixel units and the green sub-pixels. R denotes a red sub-pixel unit, G denotes a green sub-pixel unit, and B denotes a blue sub-pixel unit. Compared with FIG. 7, the sub-pixel units not depicted in FIG. 8 denote the turned-off sub-pixel units. It should be understood that the driving method may also be applied to display panel with other pixel structures. For example, the driving method may also be applied in real RGB pixel distribution.

In the present example embodiment, when the driving transistor is an N-type transistor and the reference threshold voltage is greater than the standard threshold voltage, the driving current output from the pixel driving circuit is small as a whole, and the display sub-region is yellowish when displaying a white screen, so that the color deviation of the display sub-region can be adjusted by turning off at least a portion of the red sub-pixel units and the green sub-pixel units in the display sub-region. When the driving transistor is an N-type transistor and the reference threshold voltage is less than the standard threshold voltage, the driving current output from the pixel driving circuit is large as a whole, and the display sub-region is greenish when displaying a white screen, so that the color deviation of the display sub-region can be adjusted by turning off at least a portion of the blue sub-pixel units in the display sub-region.

When the driving transistor is a P-type transistor, turning off at least a portion of the sub-pixel units in the display sub-region based on a degree that the reference threshold voltage in the sub-display region deviates from the standard threshold voltage includes:

turning off at least a portion of red sub-pixel units and green sub-pixel units in the display sub-region when the reference threshold voltage is smaller than the standard threshold voltage;

turning off at least a portion of blue sub-pixel units in the display sub-region when the reference threshold voltage is greater than the standard threshold voltage.

In the present example embodiment, when the driving transistor is a P-type transistor and the reference threshold voltage is smaller than the standard threshold voltage, the driving current output from the pixel driving circuit is small as a whole, and the display sub-region is yellowish when displaying a white screen, so that the color deviation of the display sub-region can be adjusted by turning off at least a portion of the red sub-pixel units and the green sub-pixel units in the display sub-region. When the driving transistor is a P-type transistor and the reference threshold voltage is greater than the standard threshold voltage, the driving current output from the pixel driving circuit is large as a whole, and the display sub-region is greenish when displaying a white screen, so that the color deviation of the display sub-region can be adjusted by turning off at least a portion of the blue sub-pixel units in the display sub-region.

An offset of the threshold voltage of the driving transistor may also cause difference in the brightness of different display sub-regions. In this example embodiment, when the driving transistor is an N-type transistor, turning off at least a portion of the sub-pixel units in the display sub-region based on a degree that the reference threshold voltage in the sub-display region deviates from the standard threshold voltage may include:

turning off at least a portion of red sub-pixel units, green sub-pixel units, and blue sub-pixel units in the display sub-region when the reference threshold voltage is smaller than the standard threshold voltage.

In this example embodiment, when the driving transistor is an N-type transistor and the reference threshold voltage is less than the standard threshold voltage, the driving current output from the pixel driving circuit is large as a whole, so that the brightness of the display sub-region can be reduced by turning off the red sub-pixel unit, the green sub-pixel unit, and the blue sub-pixel unit.

When the driving transistor is a P-type transistor, turning off at least a portion of the sub-pixel units in the display sub-region based on a degree that the reference threshold voltage in the sub-display region deviates from the standard threshold voltage may include:

turning off at least a portion of red sub-pixel units, green sub-pixel units, and blue sub-pixel units in the display sub-region when the reference threshold voltage is greater than the standard threshold voltage.

In this example embodiment, when the driving transistor is a P-type transistor and the reference threshold voltage is greater than the standard threshold voltage, the driving current output from the pixel driving circuit is large as a whole, so that the brightness of the display sub-region can be reduced by turning off the red sub-pixel unit, the green sub-pixel unit, and the blue sub-pixel unit.

In this example embodiment, the display sub-region may include a plurality of secondary display sub-regions, the secondary display sub-region includes M1 sub-pixel units, turning off at least a portion of the sub-pixel units in the display sub-region includes:

turning off M2 sub-pixel units in each of the secondary display sub-regions, wherein M2/M1 is smaller than or equal to 90%. For example, M2/M1 may be equal to 5%, 10%, 20%, 30%, 40%, 50%, 60%, 70%, 80%, 90%, and the like. In this example embodiment, in the driving method, the display sub-region is divided into a plurality of secondary display sub-regions. When sub-pixel units in the display sub-region are turned off, sub-pixel units that are smaller than a predetermined ratio in the secondary display sub-region may be turned off. This setting prevents the turned-off sub-pixel units from being concentrated in one region, thereby improving the display uniformity of the display panel.

In this example embodiment, the standard threshold voltage is Vth1, the reference threshold voltage is Vth2, a quantity of sub-pixel units in the display sub-region is X1, and a quantity of turned-off sub-pixel units in the display sub-region is X2. $|(Vth1-Vth2)/Vth1|$ and X2/X1 may be positively correlated. That is, the greater the degree that the reference threshold voltage in the sub-display region deviates from the standard threshold voltage is, the greater the number of sub-pixel units to be turned off is.

In other example embodiments, the color and corresponding number of sub-pixel units to be turned off in each display sub-region may be pre-stored in a first database in the display panel. Turning off at least a portion of non-zero grayscale sub-pixel units in at least a portion of the display sub-regions based on the initial image data may include:

invoking a pre-stored first database, wherein the first database includes a color and a corresponding quantity ratio of sub-pixel units to be turned off in each display sub-region;

turning off sub-pixel units of a corresponding color and quantity ratio in the display sub-region based on the first database.

In this example embodiment, the first database may be acquired by color accuracy of each display sub-region in the display panel.

In the present example embodiment, the turned-off sub-pixel unit may be a low grayscale sub-pixel unit. Since the driving current of the low grayscale sub-pixel unit is small, the low grayscale sub-pixel unit is most likely to have a color deviation problem due to threshold value and the like, and the low grayscale sub-pixel unit has a small effect on the overall brightness of the display sub-region, the present example embodiment may turn off the low grayscale sub-pixel unit preferentially. The low grayscale may be the grayscale with a grayscale value less than a preset value. The preset value may be set according to the actual situation, and the preset value may also be adjusted in real time during the driving process of the display panel. For example, the preset value may be adjusted larger when the proportion of sub-pixel units to be turned off is high, and the preset value may be adjusted smaller when the proportion of sub-pixel units to be turned off is low. In a display panel with a maximum grayscale of 255 grayscales, the preset value may be greater than or equal to 2 and smaller than or equal to 60. For example, the preset value may be 2, 20, 30, 40, 50, 60, etc.

In the present example embodiment, turning off at least a portion of the sub-pixel units in at least a portion of the display sub-regions based on the initial image data may include:

turning off repeating units in a portion of the display sub-regions based on the initial image data, wherein the repeating units include sub-pixel units of different colors.

The present example embodiment may use the repeating unit as the minimum turn-off unit, and since the repeating unit includes sub-pixel units of different colors, the setting may enable the turned-off sub-pixel units of the same color to be distributed in different regions, thereby avoiding serious color deviation of the display panel.

In the present example embodiment, the uniformity adjustment manner may further include:

acquiring grayscales of at least a portion of the sub-pixel units in the display sub-region based on the sub-image data, and acquiring a reference grayscale value corresponding to the display sub-region based on the acquired grayscales of at least a portion of the sub-pixel units in the display sub-region;

determining a quantity of sub-pixel units in the repeating unit based on the reference grayscale value, wherein the reference grayscale value and the quantity of sub-pixel units in the repeating unit are positively correlated.

In this example embodiment, acquiring a reference grayscale value corresponding to the display sub-region based on the acquired grayscales of at least a portion of the sub-pixel units in the display sub-region may include:

acquiring an average value of a plurality of grayscales as the reference grayscale value based on the acquired grayscales of at least a portion of the sub-pixel units in the display sub-region; or, acquiring a median value of the plurality of grayscales as the reference grayscale value based on the acquired grayscales of at least a portion of the sub-pixel units in the display sub-region.

In this example embodiment, the reference grayscale value characterizes an average grayscale value in the display sub-region, and the larger the reference grayscale value in the display sub-region is, the greater the number of sub-pixel units to be turned off is, and correspondingly, the greater the number of sub-pixel units included in the repeating unit is, in the premise that the number of repeating units to be turned off is not changed. This setting can reduce the computational load of the display panel, without changing the amount of data of the turned-off repeat units.

Figure 9:
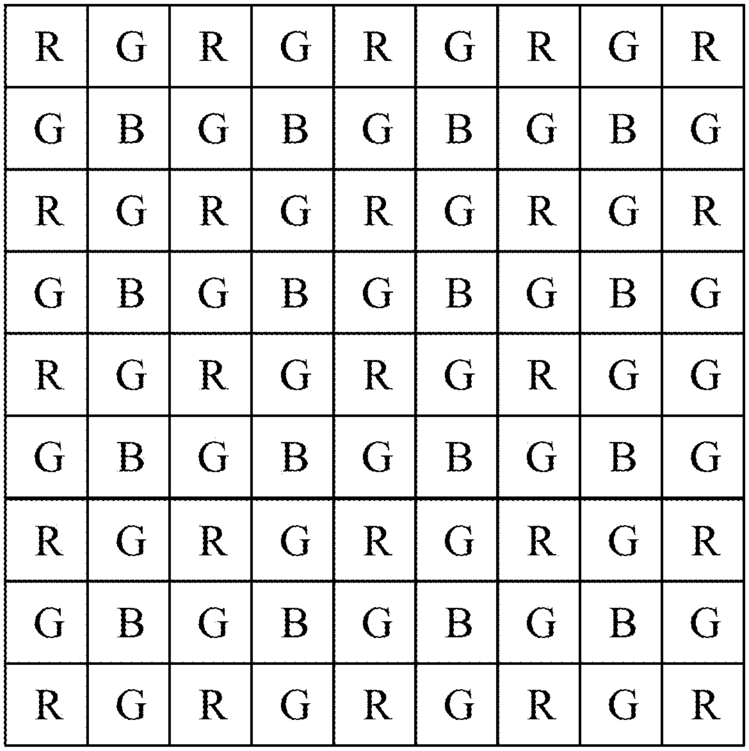
FIG. 9 shows a distribution diagram of sub-pixel units of the display panel in an example embodiment of the present disclosure.
Figure 10:
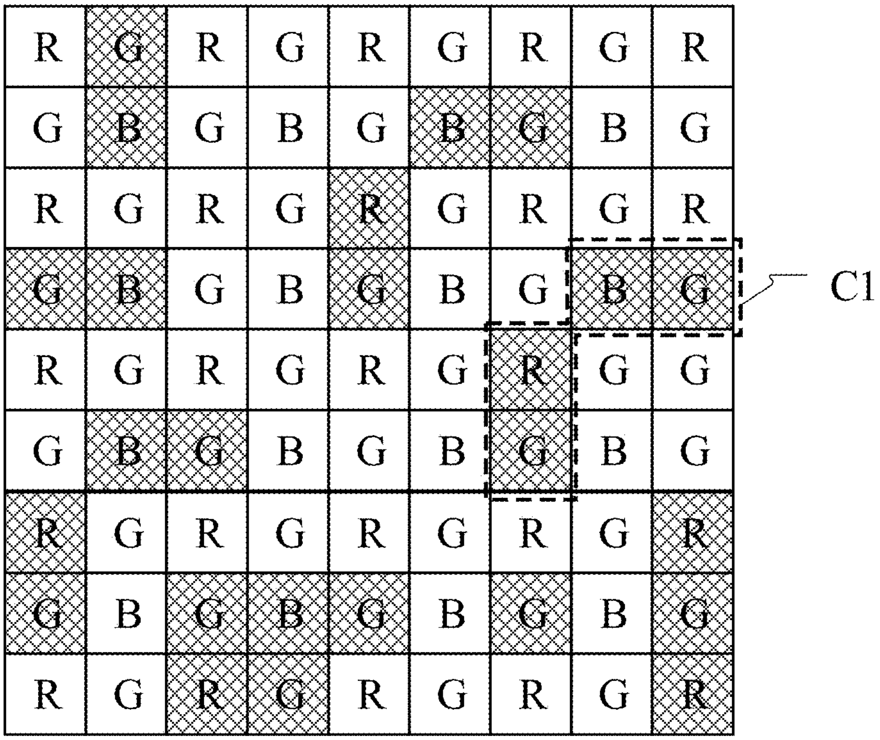
FIG. 10 shows the distribution diagram of turned-off repeating units under high grayscale.
Figure 11:
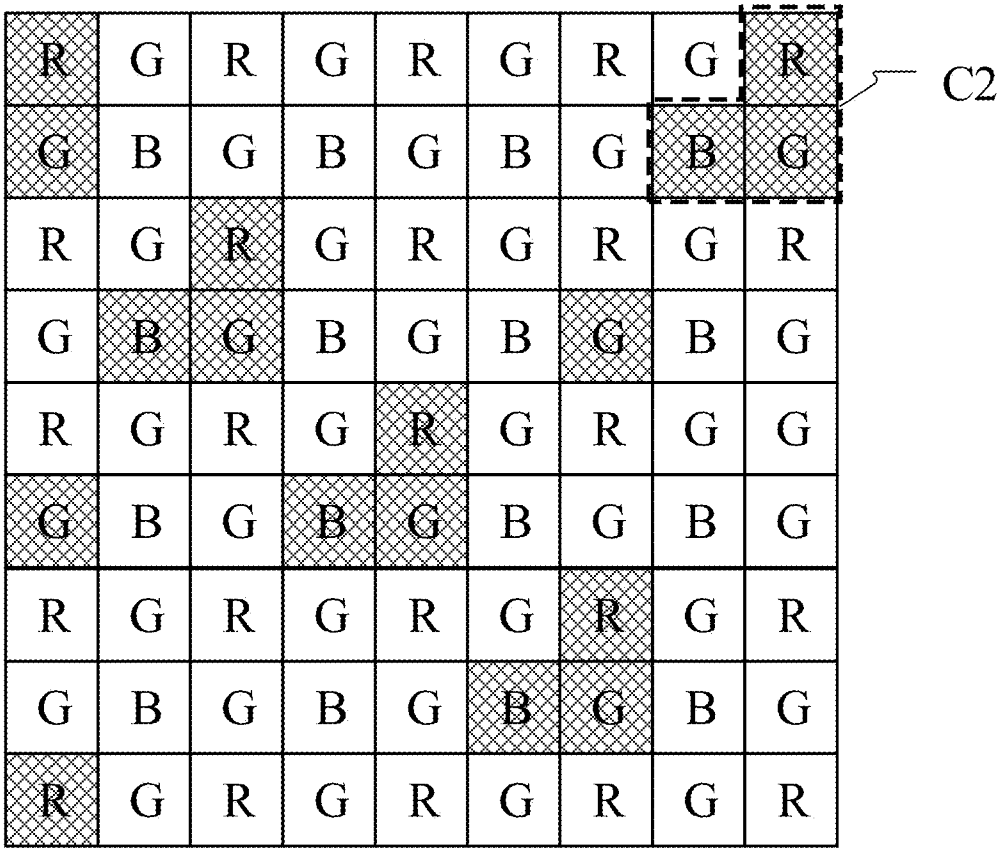
FIG. 11 shows the distribution diagram of turned-off repeating units under low grayscale.

As shown in FIGS. 9-11, FIG. 9 shows a distribution diagram of sub-pixel units of the display panel in an example embodiment of the present disclosure, FIG. 10 shows the distribution diagram of turned-off repeating units under high grayscale, FIG. 11 shows the distribution diagram of turned-off repeating units under low grayscale. As shown in FIGS. 9-11, R denotes a red sub-pixel unit, G denotes a green sub-pixel unit, and B denotes a blue sub-pixel unit. The squares with background patterns indicate the turned-off sub-pixel units. As shown in FIG. 10, at the display brightness value of 1 nit and the grayscales of 10, the repeating unit C1 includes one red sub-pixel unit, one blue sub-pixel unit, and two green sub-pixel units. As shown in FIG. 11, at the display brightness value of 1 nit and the grayscales of 5, the repeating unit C2 includes one red sub-pixel unit, one blue sub-pixel unit, and one green sub-pixel unit.

It is to be noted that, turning off at least a portion of the sub-pixel units in at least a portion of the display sub-regions based on the initial image data may simultaneously include: turning off the repeating unit and turning off the individual sub-pixel unit.

Both the Display Brightness Value (DBV) and the reference grayscale value of the display panel affect the number of sub-pixel units to be turned off. In this example embodiment, turning off at least a portion of non-zero grayscale sub-pixel units in at least a portion of the display sub-regions based on the initial image data may include:

acquiring a current display brightness value of the display panel;

acquiring grayscales of at least a portion of the sub-pixel units in the display sub-region, and acquiring a reference grayscale value corresponding to the display sub-region based on the acquired grayscales of at least a portion of the sub-pixel units in the display sub-region;

controlling a turn-off ratio of sub-pixel units in the display sub-region based on the current display brightness value and the reference grayscale value, wherein the turn-off ratio is a ratio of a quantity of turned-off sub-pixel units in the display sub-region to a total quantity of sub-pixel units in the display sub-region;

wherein the current display brightness value and the turn-off ratio are negatively correlated, and the reference grayscale value and the turn-off ratio are negatively correlated.

In the present example embodiment, the ratio of the number of sub-pixel units to be turned off is acquired based on the current display brightness value and the reference grayscale value, so that the display uniformity of the display panel can be precisely adjusted.

In the present example embodiment, the switching transistor in the pixel driving circuit has a certain turn-off leakage current. When the grayscale of the sub-pixel unit is small, the driving current output from the pixel driving circuit is also small, and the leakage current of the switching transistor has a particularly prominent effect on the brightness of the low-grayscale sub-pixel unit. In the present example embodiment, the driving method further includes:

acquiring a current display brightness value of the display panel;

acquiring a grayscale threshold value using the current display brightness value based on a second database pre-stored in the display panel, wherein the second database includes a mapping relationship between the current display brightness value and the grayscale threshold value;

acquiring grayscales of at least a portion of sub-pixel units in the display sub-region, and acquiring a reference grayscale value corresponding to the display sub-region based on the acquired grayscales of at least a portion of sub-pixel units in the display sub-region;

comparing the grayscale threshold and the reference grayscale value, and initiating the uniformity adjustment manner when the reference grayscale value is smaller than or equal to the grayscale threshold.

The present example embodiment may initiate the uniformity adjustment manner again when the reference grayscale value is smaller than or equal to the grayscale threshold, to avoid the effect of the uniformity adjustment manner on the normal display.

In this example embodiment, the maximum brightness for initiating the uniformity adjustment manner may be obtained through the shielding length and width of the displaying panel, the resolution, color coordinates of the R, G, B sub-pixel units, luminous efficiency of the R, G, B sub-pixel units, the white point color coordinates, the white point luminance, and aperture ratios of the R, G, B sub-pixel units. The maximum grayscale value for initiating the uniformity adjustment manner under each display brightness value is acquired according to the maximum brightness.

Figure 12:
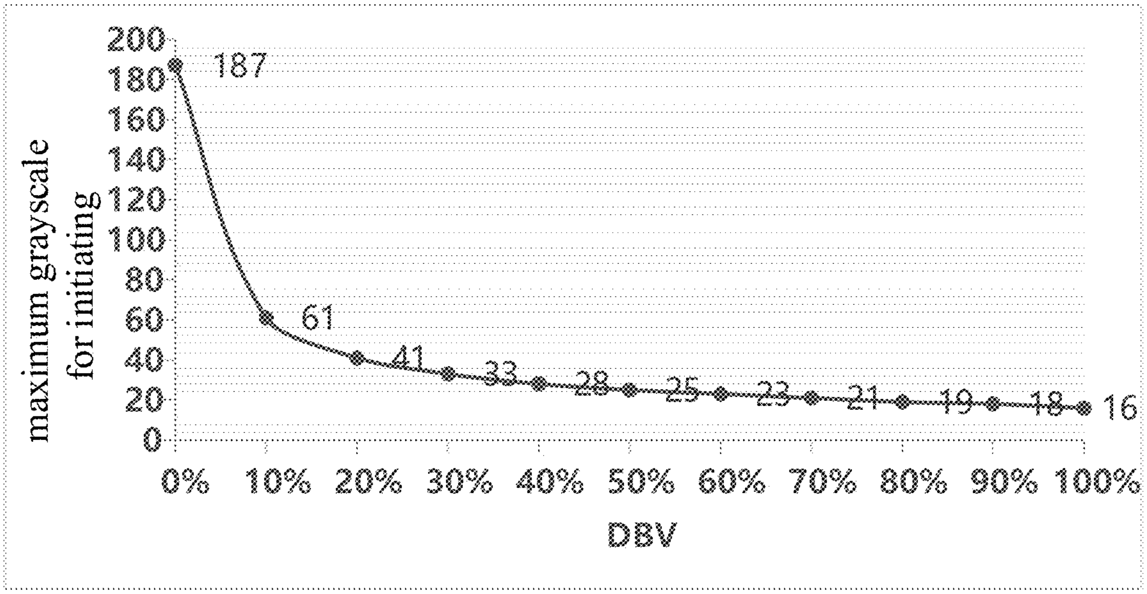
FIG. 12 shows the maximum grayscale value of a display panel for initiating the uniformity adjustment manner under different DBVs.

As shown in FIG. 12, it shows the maximum grayscale value of a display panel for initiating the uniformity adjustment manner under different DBVs.

Figure 13:
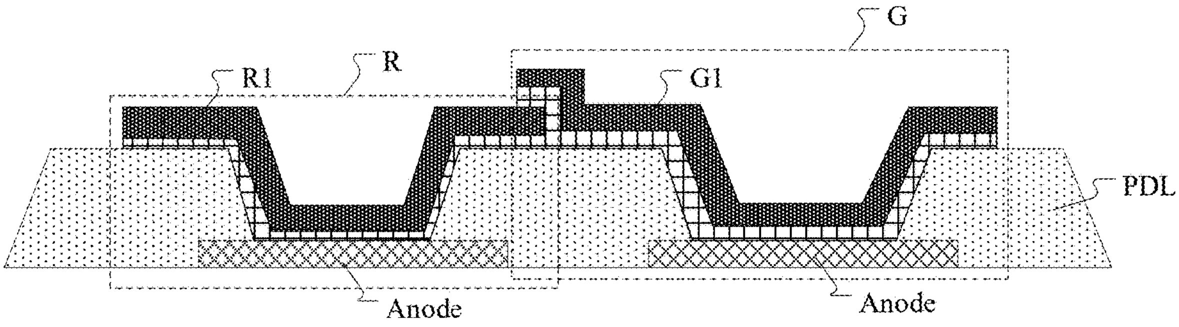
FIG. 13 shows a partially structural schematic diagram of sub-pixel units of a display panel in an example embodiment of the present disclosure.

In the present example embodiment, as shown in FIG. 13, it shows a partially structural schematic diagram of sub-pixel units of a display panel in an example embodiment of the present disclosure. Anode is an anode of the light emitting unit, PDL is a pixel defining layer, R1 is a light emitting layer of the red light emitting unit, and G1 is a light emitting layer of the green light emitting unit. The display panel may utilize an evaporation process to sequentially form the blue light emitting units, the red light emitting units R, and the green light emitting units G. A portion of the green light emitting units G is located on the red light emitting unit R, which results in a reddish color of the display panel when the display panel displays a purely green screen. In this example embodiment, when the display panel is driven by pure image data of a first color, at least a portion of the sub-pixel units display the first color and a second color;

turning off at least a portion of non-zero grayscale sub-pixel units in at least a portion of the display sub-regions based on the initial image data may further include:

turning off at least a portion of the sub-pixel units of the second color when the initial image data includes data for driving sub-pixel units of the first color and sub-pixel units of the second color.

In this example embodiment, the first color may be green and the second color may be red. In this example embodiment, the color deviation may be improved by turning off the sub-pixel units of the second color. It should be understood that in other example embodiments, the first color and the second color may also be other colors.

In this example embodiment, when the display panel is driven by pure screen data of green and the color coordinate x of the display panel is 0.328-0.4, more than 95% of the red sub-pixel units can be turned off. For example, 95% of the red sub-pixel units, 96% of the red sub-pixel units, 97% of the red sub-pixel units, 98% of the red sub-pixel units, 99% of the red pixel units, 100% of the red sub-pixel units can be turned off.

In this example embodiment, turning off the non-zero grayscale sub-pixel unit may include:

writing a data signal of zero grayscale to the non-zero grayscale sub-pixel unit; or, not writing the data signal to the non-zero grayscale sub-pixel unit.

In the present example embodiment, when the sub-pixel unit is turned off, the sub-pixel unit can be turned off randomly according to a color and a corresponding ratio of the sub-pixel unit to be turned off, or the sub-pixel unit at a preset position can be turned off according to a color and a corresponding ratio of the sub-pixel unit to be turned off.

Figure 14:
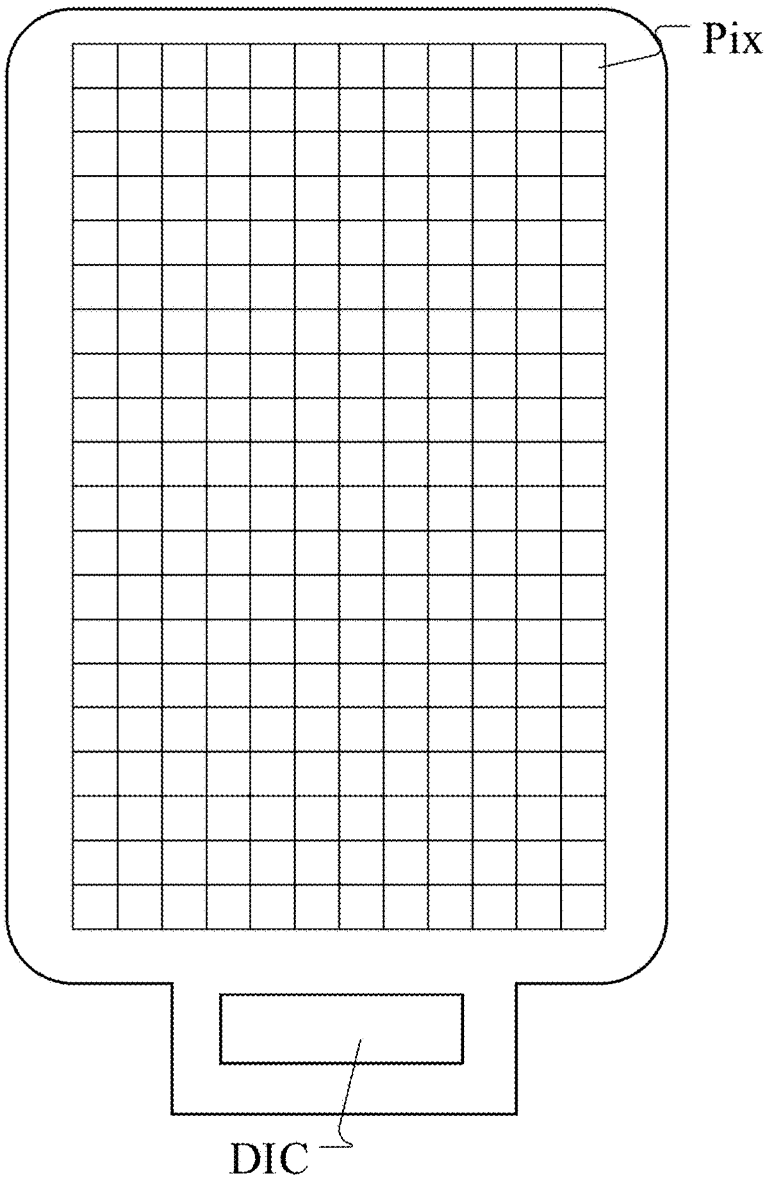
FIG. 14 shows a schematic diagram of a functional structure of the display panel of an example embodiment of the present disclosure.

The present example embodiment also provides a display panel, which can perform the above-described driving method. FIG. 14 shows a schematic diagram of a functional structure of the display panel of an example embodiment of the present disclosure. The display panel includes: a plurality of sub-pixel units Pix, a driving chip DIC, and the driving chip DIC can be configured to:

acquire initial image data; and initiate a uniformity adjustment manner, wherein the uniformity adjustment manner includes: turning off at least a portion of non-zero grayscale sub-pixel units in the display panel based on the initial image data.

In this example embodiment, the driving chip DIC may also perform all of the above-described driving methods.

The present example embodiment also provides a display apparatus, wherein the display panel described above is included. The display apparatus may be a cell phone, a tablet computer, a television, and the like.

Other embodiments of the present disclosure will be apparent to those skilled in the art from consideration of the specification and practice of the present disclosure disclosed herein. The present application is intended to cover any variation, use, or adaptation of embodiments of the present disclosure, which are in accordance with the general principles of the present disclosure and include common general knowledge or conventional technical means in the art that are not disclosed in the present disclosure. The specification and embodiments are illustrative only, and the real scope and spirit of embodiments of the present disclosure is defined by the appended claims.

The accompanying drawings in the present disclosure relate only to the structures involved by the present disclosure, and reference may be made to the usual designs for other structures. Without conflict, embodiments and features in embodiments of the present disclosure may be combined with each other to obtain new embodiments. It should be understood by those of ordinary skill in the art that modifications or equivalent substitutions may be made to the technical solutions of the present disclosure without departing from the spirit and scope of the technical solutions of the present disclosure, and shall be covered by the scope of the claims of the present disclosure.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A driving method of a display panel, comprising:

acquiring initial image data; and initiating a uniformity adjustment manner, wherein the uniformity adjustment manner comprises: turning off at least a portion of non-zero grayscale sub-pixel units in the display panel based on the initial image data, wherein a display region of the display panel comprises a plurality of display sub-regions, and sub-pixel units located in respective display sub-regions;

wherein the initial image data comprises a plurality of sub-image data, the sub-image data and the display sub-regions are provided correspondingly, and the display sub-regions are configured to display the sub-image data corresponding thereto;

wherein turning off at least a portion of non-zero grayscale sub-pixel units in the display panel based on the initial image data comprises:

turning off at least a portion of the sub-pixel units in at least a portion of the display sub-regions based on the initial image data.

2. The driving method of the display panel according to claim 1, wherein the sub-pixel unit comprises a pixel driving circuit, the pixel driving circuit comprises a driving transistor;

wherein turning off at least a portion of non-zero grayscale sub-pixel units in at least a portion of the display sub-regions based on the initial image data comprises:

acquiring a standard threshold voltage of the display panel;

acquiring threshold voltages of at least a portion of the driving transistors in the display sub-region;

acquiring a reference threshold voltage corresponding to the display sub-region based on the acquired threshold voltages of the driving transistors in the display sub-region;

turning off at least a portion of the sub-pixel units in the display sub-region based on a degree that the reference threshold voltage corresponding to the sub-display region deviates from the standard threshold voltage.

3. The driving method of the display panel according to claim 2, wherein the plurality of display sub-regions comprise a first display sub-region, the first display sub-region has a color deviation smaller than or equal to 2JNCD;

wherein acquiring a standard threshold voltage of the display panel comprises:

acquiring a reference threshold voltage of the first display sub-region as the standard threshold voltage.

4. The driving method of the display panel according to claim 2, wherein acquiring a standard threshold voltage of the display panel comprises:

acquiring a threshold voltage set by the driving transistor during gamma adjustment as the standard threshold voltage.

5. The driving method of the display panel according to claim 2, wherein acquiring a reference threshold voltage corresponding to the display sub-region based on the acquired threshold voltages of the driving transistors in the display sub-region comprises:

acquiring an average value of a plurality of threshold voltages as the reference threshold voltage based on the acquired threshold voltages of the driving transistors in the display sub-region; or, acquiring a median value of the plurality of threshold voltages as the reference threshold voltage based on the acquired threshold voltages of the driving transistors in the display sub-region.

6. The driving method of the display panel according to claim 2, wherein in a case that the driving transistor is an N-type transistor, wherein turning off at least a portion of the sub-pixel units in the display sub-region based on a degree that the reference threshold voltage in the sub-display region deviates from the standard threshold voltage comprises:

turning off at least a portion of red sub-pixel units and green sub-pixel units in the display sub-region in response to determining that the reference threshold voltage is greater than the standard threshold voltage;

turning off at least a portion of blue sub-pixel units in the display sub-region when the reference threshold voltage is smaller than the standard threshold voltage.

7. The driving method of the display panel according to claim 2, wherein in a case that the driving transistor is a P-type transistor, wherein turning off at least a portion of the sub-pixel units in the display sub-region based on a degree that the reference threshold voltage in the sub-display region deviates from the standard threshold voltage comprises:

turning off at least a portion of red sub-pixel units and green sub-pixel units in the display sub-region in response to determining that the reference threshold voltage is smaller than the standard threshold voltage;

turning off at least a portion of blue sub-pixel units in the display sub-region when the reference threshold voltage is greater than the standard threshold voltage.

8. The driving method of the display panel according to claim 2, wherein in a case that the driving transistor is an N-type transistor, wherein turning off at least a portion of the sub-pixel units in the display sub-region based on a degree that the reference threshold voltage in the sub-display region deviates from the standard threshold voltage comprises:

turning off at least a portion of red sub-pixel units, green sub-pixel units, and blue sub-pixel units in the display sub-region in response to determining that the reference threshold voltage is smaller than the standard threshold voltage;

in a case that the driving transistor is a P-type transistor, wherein turning off at least a portion of the sub-pixel units in the display sub-region based on a degree that the reference threshold voltage in the sub-display region deviates from the standard threshold voltage comprises:

turning off at least a portion of red sub-pixel units, green sub-pixel units, and blue sub-pixel units in the display sub-region in response to determining that the reference threshold voltage is greater than the standard threshold voltage.

9. The driving method of the display panel according to claim 2, wherein the display sub-region comprises a plurality of secondary display sub-regions, the secondary display sub-region comprises M1 sub-pixel units, turning off at least a portion of the sub-pixel units in the display sub-region comprises:

turning off M2 sub-pixel units in each of the secondary display sub-regions, wherein M2/M1 is smaller than or equal to 90%.

10. The driving method of the display panel according to claim 2, wherein the standard threshold voltage is Vth1, the reference threshold voltage is Vth2, a quantity of sub-pixel units in the display sub-region is X1, and a quantity of turned-off sub-pixel units in the display sub-region is X2;

wherein $|(Vth1-Vth2)/Vth1|$ and X2/X1 are positively correlated.

11. The driving method of the display panel according to claim 1, wherein turning off at least a portion of non-zero grayscale sub-pixel units in at least a portion of the display sub-regions based on the initial image data comprises:

invoking a pre-stored first database, wherein the first database comprises a color and a corresponding quantity ratio of sub-pixel units to be turned off in each display sub-region;

turning off sub-pixel units of a corresponding color and quantity ratio in the display sub-region based on the first database, wherein the first database is acquired by color accuracy of each display sub-region in the display panel, and the turned-off sub-pixel unit is a low grayscale sub-pixel unit.

12. The driving method of the display panel according to claim 1, wherein turning off at least a portion of the sub-pixel units in at least a portion of the display sub-regions based on the initial image data comprises:

turning off repeating units in a portion of the display sub-regions based on the initial image data, wherein the repeating units comprise sub-pixel units of different colors, wherein the uniformity adjustment manner further comprises:

acquiring grayscales of at least a portion of the sub-pixel units in the display sub-region based on the sub-image data, and acquiring a reference grayscale value corresponding to the display sub-region based on the acquired grayscales of at least a portion of the sub-pixel units in the display sub-region;

determining a quantity of sub-pixel units in the repeating unit based on the reference grayscale value, wherein the reference grayscale value and the quantity of sub-pixel units in the repeating unit are positively correlated.

13. The driving method of the display panel according to claim 1, wherein turning off at least a portion of non-zero grayscale sub-pixel units in at least a portion of the display sub-regions based on the initial image data comprises:

acquiring a current display brightness value of the display panel;

acquiring grayscales of at least a portion of the sub-pixel units in the display sub-region based on the sub-image data, and acquiring a reference grayscale value corresponding to the display sub-region based on the acquired grayscales of at least a portion of the sub-pixel units in the display sub-region;

controlling a turn-off ratio of sub-pixel units in the display sub-region based on the current display brightness value and the reference grayscale value, wherein the turn-off ratio is a ratio of a quantity of turned-off sub-pixel units in the display sub-region to a total quantity of sub-pixel units in the display sub-region;

wherein the current display brightness value and the turn-off ratio are negatively correlated, and the reference grayscale value and the turn-off ratio are negatively correlated.

14. The driving method of the display panel according to claim 13, wherein acquiring a reference grayscale value corresponding to the display sub-region based on the acquired grayscales of at least a portion of the sub-pixel units in the display sub-region comprises:

acquiring an average value of a plurality of grayscales as the reference grayscale value based on the acquired grayscales of at least a portion of the sub-pixel units in the display sub-region; or, acquiring a median value of the plurality of grayscales as the reference grayscale value based on the acquired grayscales of at least a portion of the sub-pixel units in the display sub-region.

15. The driving method of the display panel according to claim 1, wherein the driving method further comprises:

acquiring a current display brightness value of the display panel;

acquiring a grayscale threshold value using the current display brightness value based on a second database pre-stored in the display panel, wherein the second database comprises a mapping relationship between the current display brightness value and the grayscale threshold value;

acquiring grayscales of at least a portion of sub-pixel units in the display sub-region based on the sub-image data, and acquiring a reference grayscale value corresponding to the display sub-region based on the acquired grayscales of at least a portion of sub-pixel units in the display sub-region;

comparing the grayscale threshold and the reference grayscale value, and initiating the uniformity adjustment manner in response to determining that the reference grayscale value is smaller than or equal to the grayscale threshold.

16. The driving method of the display panel according to claim 1, wherein when the display panel is driven by pure image data of a first color, at least a portion of the sub-pixel units display the first color and a second color;

wherein turning off at least a portion of non-zero grayscale sub-pixel units in at least a portion of the display sub-regions based on the initial image data comprises:

turning off at least a portion of the sub-pixel units of the second color in a case that the initial image data comprises data for driving sub-pixel units of the first color and sub-pixel units of the second color, wherein the first color is green, the second color is red, and the display panel has a color coordinate x of 0.328-0.4 when the display panel is driven by pure image data of the first color;

wherein turning off at least a portion of the sub-pixel units of the second color comprises:

turning off more than 95% of the sub-pixel units of the second color.

17. The driving method of the display panel according to claim 1, wherein turning off the non-zero grayscale sub-pixel unit comprises:

writing a data signal of zero grayscale to the non-zero grayscale sub-pixel unit; or, not writing the data signal to the non-zero grayscale sub-pixel unit.

18. A display panel, comprising:

a plurality of sub-pixel units; and a driving chip, configured to:

acquire initial image data; and initiate a uniformity adjustment manner, wherein the uniformity adjustment manner comprises: turning off at least a portion of non-zero grayscale sub-pixel units in the display panel based on the initial image data, wherein a display region of the display panel comprises a plurality of display sub-regions, and sub-pixel units located in respective display sub-regions;

wherein the initial image data comprises a plurality of sub-image data, the sub-image data and the display sub-regions are provided correspondingly, and the display sub-regions are configured to display the sub-image data corresponding thereto;

wherein the driving chip is further configured to:

turn off at least a portion of the sub-pixel units in at least a portion of the display sub-regions based on the initial image data.

19. A display apparatus, comprising a display panel, wherein the display panel comprises:

a plurality of sub-pixel units; and a driving chip, configured to:

acquire initial image data; and initiate a uniformity adjustment manner, wherein the uniformity adjustment manner comprises: turning off at least a portion of non-zero grayscale sub-pixel units in the display panel based on the initial image data, wherein a display region of the display panel comprises a plurality of display sub-regions, and sub-pixel units located in respective display sub-regions;

wherein the initial image data comprises a plurality of sub-image data, the sub-image data and the display sub-regions are provided correspondingly, and the display sub-regions are configured to display the sub-image data corresponding thereto;

wherein the driving chip is further configured to:

turn off at least a portion of the sub-pixel units in at least a portion of the display sub-regions based on the initial image data.

* * * * *